Jan. 31, 1956

J. W. DICKEY 2,732,709

BENCH TYPE FREEZEMETER

Filed May 11, 1953

WITNESS: Esther M. Stockton

INVENTOR.
John W. Dickey
BY
Clinton L. Janes
ATTORNEY

United States Patent Office 2,732,709
Patented Jan. 31, 1956

2,732,709
BENCH TYPE FREEZEMETER

John W. Dickey, Newfield, N. Y., assignor to Bendix Aviation Corporation, a corporation of Delaware Application May 11, 1953, Serial No. 354,260

6 Claims. (Cl. 73—17)

The present invention relates to a bench type freezemeter and more particularly to a device in the nature of a laboratory instrument for providing a clear and unmistakable indication of the thawing point of a liquid coolant for internal combustion engines and the like.

It is an object of the present invention to provide a novel device of this type which is simple and economical in construction and is adapted to provide constant readings under a wide variety of operating conditions.

It is another object to provide such a device in which means for freezing a test sample of the liquid is formed as a unit separate from the sample-holder and thermometer.

It is another object to provide such a device including means for agitating the sample of liquid during the freezing process, to reduce the tendency of the sample to "supercool" or retain more or less of its fluidity at temperatures lower than its true freezing point.

Further objects and advantages will be apparent from the following description taken in connection with the accompanying drawing in which.

Figure 1:
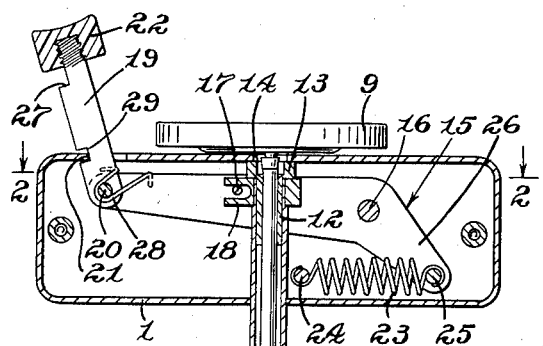
Fig. 1 is a vertical substantially mid-sectional view of a sampling tube and thermometer unit.
Figure 3:
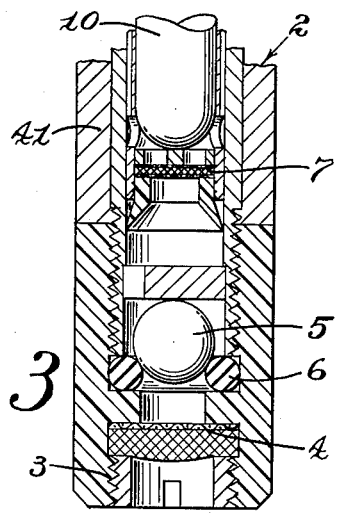
Fig. 3 is an enlarged sectional detail of the lower end of the sampling tube with its inlet check valve.

In Fig. 1 of the drawing there is illustrated a casing 1 which is preferably formed as a convenient handle for the freezemeter instrument, and from which projects a cylindrical tube 2 for receiving and holding a sample of the liquid whose freezing point is to be determined. The tube 2 has an inlet opening 3 at its free end in which is mounted a strainer 4 and a check valve comprising a ball 5 cooperating with a ring 6 of rubber or the like. The tube 2 is preferably provided with a second strainer 7 above the check valve 5 and has one or more lateral outlet openings 8 spaced a substantially distance from the inlet, permitting escape of excess liquid from the tube.

A thermometer 9 having a smooth cylindrical stem 10 is mounted on the casing 1 with its stem traversing the casing and its lower end loosely slidable in the sampling tube 2, with the heat-sensitive element 11 of the thermometer located between the free end of the tube and the outlet openings therefrom, so as to be surrounded by the sample of liquid in the tube.

The tube 2 is slidably mounted in the casing 1, being piloted at its inner end on a reduced extension 12 of a bushing 13 fixedly mounted in the casing 1 and providing a swivel bearing for the thermometer stem 10 as indicated at 14.

Manually operable means is provided for reciprocating the sampling tube realtively to the casing and thermometer stem comprising a lever 15 pivoted at 16 in the casing 1 and having a pin 17 loosely received by a fork member 18 fixedly mounted on the inner end of said tube. A plunger 19 is pivoted at 20 to the end of the lever 15 and projects through an opening 21 in the casing, a button 22 being mounted on the upper end of the plunger to facilitate manual operation. Means for normally holding the tube 2 in its raised position as illustrated in Fig. 1 is provided in the form of a spring 23 which is anchored at one end to the casing 1 by means of a pin 24, and is connected at its other end by a pin 25 to an inclined arm 26 of the lever 15. The inclination of the lever arm 26 is so related to the anchorage points 24, 25 of spring 23 and pivot 16 of the lever 15 that the lifting force of the spring 23 on the tube 2 as transmitted through the lever 15 remains substantially constant throughout the longitudinal movement of the tube.

Means are provided for latching the tube 2 near the lower end of its stroke in the form of a notch in the side of the plunger 19 providing a shoulder 27 arranged to engage under the top wall of the casing 1 when the plunger is depressed and then moved to the left about its pivot 20. The notch 27 is elongated as illustrated in order to permit limited reciprocation of the thermometer by periodic pressure on and release of the button 22, such reciprocation causing agitation of the liquid in the tube. A spring 28 is preferably employed to bias the plunger 19 toward its latched position.

The plunger 19 is provided with a second notch 29 positioned to receive the top wall of the casing when the plunger is at the top of its stroke as illustrated. This permits the spring 28 to swing the plunger to the left as it approaches the end of its upward stroke, which movement provides a convenient indicator to signalize a uniform end point in the thawing cycle.

Figure 4:
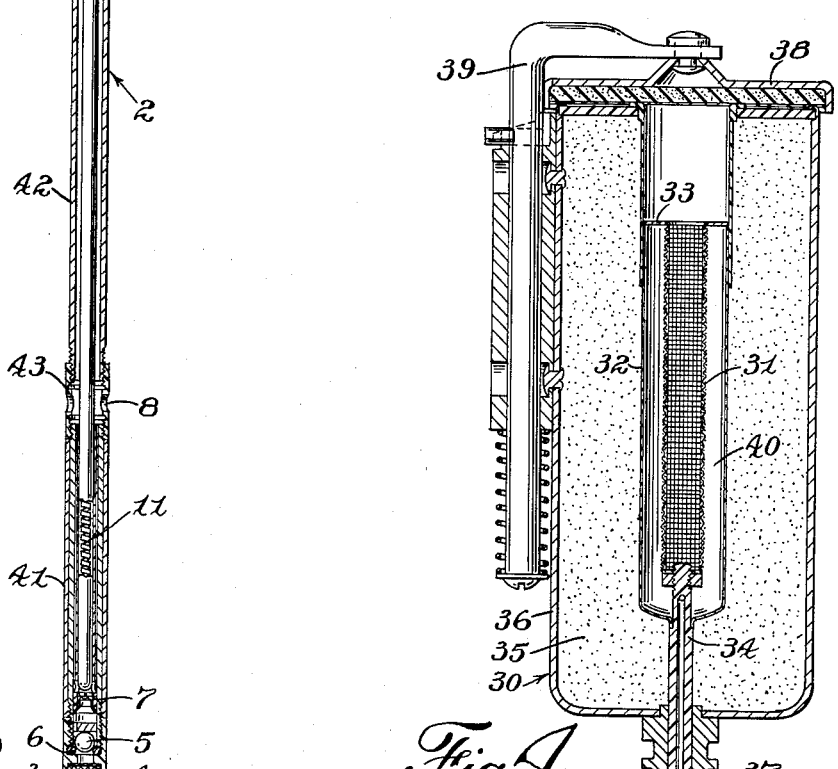
Fig. 4 is a substantially mid-sectional view of a preferred form of freezing chamber adapted to receive the sampling tube and thermometer unit.
Figure 2:
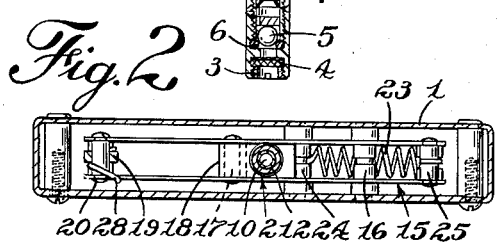
Fig. 2 is a section taken substantially on the line 2—2 of Fig. 1.

A refrigerated chamber indicated generally by numeral 30 is provided for receiving the sampling tube 2 and its associated parts, and freezing the sample surrounding the thermometer stem within said tube. As shown in Fig. 4, this chamber comprises a tubular foraminous holder 31 which is maintained in coaxially spaced relation within a cylinder 32 by means of an apertured spacing washer 33 at its upper end and a threaded conduit member 34 at its lower end. The cylinder 32 is surrounded by a mass of insulating material 35 of any suitable character which is contained in an outer cylindrical casing 36 from the lower end of which the conduit 34 emerges and is provided with means 37 for attachment to a source of cooling medium such as a flask of compressed carbon dioxide. The upper end of the cylinder 32 is preferably closed by an insulating cap 38 which is carried by a spring-pressed pivoted arm 39.

In the operation of the device, the thermometer and sampling tube unit is introduced at its lower end into a container of the liquid to be tested, and the tube 2 is reciprocated with respect to the thermometer stem by pressing and releasing the plunger 19 while maintaining it in a vertical position, out of latching engagement with the casing 1. This action causes the tube and thermometer stem to coact as a pump cylinder and piston and draw the liquid in through the check valve 5, 6, flushing and filling the space between the thermometer stem and the interior of the sampling tube, the excess of liquid emerging at the openings 8. The tube 2 is then latched in its depressed position by pivotal movement of the plunger 19 to the left in Fig. 1 to cause the shoulder 27 to engage the edge of the casing 1. The tube 2 is then wiped free from excess moisture and introduced into the holder 31 of freezing chamber 30. The valve of the carbon dioxide flask, not illustrated, is then opened, thereby permitting the gas to expand through the orifice 44 and flow through the conduit member 34 into the space 40 between the holder 31 and cylinder 32. The carbon dioxide gas escapes through the interstices of the holder 31, leaving said space charged with carbon dioxide snow.

When samples having very low freezing points are being tested, the solidification of the sample liquid surrounding the thermometer stem 10 is facilitated by reciprocating the tube by means of the plunger 19 as permitted by the elongated notch 27, until the thermometer stem becomes immobilized in the sampling tube. This agitation of the sample promotes crystallization and reduces the tendency of the liquid to "supercool".

When the sample has been thoroughly frozen, the thermometer and sampling tube assembly is removed from the freezing chamber and the plunger 19 is moved on its pivot 20 to retract the shoulder 27 from its engagement with the casing 1. At this time, the slight amount of play of the pin 17 in the yoke 18 permits the spring 23 to raise the plunger 19 slightly and thereby prevent reengagement of the shoulder 27 under the edge of casing 1. The instrument is then permitted to warm up gradually by absorbing heat from the ambient atmosphere until the thawing of the sample permits the spring 23 to move the tube 2 upwardly with respect to the thermometer stem 10, raising the plunger 19 until the notch 29 comes into registry with the edge of the casing 1, and the spring 28 is thus enabled to cant the plunger around its pivot 20. When this is observed by the operator, the concurrent reading of the thermometer is recorded as the thawing point of the sample under test.

In order to insulate the portion of the tube 2 which contains the sample under test, and prevent transfer of heat from the remaining portion of the tube, said tube is preferably made in two sections 41 and 42 which are connected by a coupling 43 of suitable insulating material such as nylon. It has been found convenient to form the outlet openings 8 in the insulating coupling 43 as illustrated.

It will be understood that other types of thermometer may be substituted for the mechanical type shown, and various changes may be made in the precise form and arrangement of the parts without departing from the spirit of the invention defined in the appended claims.

I claim:

1. In a freezing point tester for liquids, a casing, a cylindrical sample-holding tube projecting therefrom having an inlet at its free end and a lateral outlet opening spaced therefrom, an inwardly opening check valve in said inlet, a thermometer comprising a cylindrical stem having a loose sliding fit in the tube with its temperature-sensitive element located between the free end of the tube and said lateral opening, manually operable means for causing relative longitudinal movement between the thermometer stem and the tube, spring actuated means in the casing opposing said manually operable means, releasable means for latching the tube and thermometer stem against the action of the spring, while permitting a limited relative reciprocatory movement of said parts, and a freezing chamber adapted to receive the stem and tube.

2. An instrument as set forth in claim 1 in which the spring actuated means includes a lever system arranged to exert a substantially constant force throughout the major portion of the relative movement of the tube and thermometer stem.

3. In a bench-type freezemeter, a sampling tube having an inlet at one end and an outlet spaced longitudinally therefrom, a thermometer including a cylindrical stem having a loose sliding fit in the sampling tube with its temperature-sensitive element located between the inlet and outlet thereof, means whereby relative reciprocation of the tube and thermometer stem draws the liquid sample in the inlet and around the thermometer stem; a freezing chamber adapted to receive the stem and tube, and resilient means for causing relative longitudinal movement between the thermometer stem and the tube upon subsequent thawing of the sample.

4. A bench-type freezemeter as set forth in claim 3 including further manually operable means for causing relative reciprocation of the thermometer stem and sampling tube during the freezing operation.

5. A bench type freezemeter as set forth in claim 3 including further releasable means for restricting the relative movement of the thermometer stem and tube during the freezing oepration.

6. A freezemeter as set forth in claim 5 in which said releasable restricting means comprises a manually operable member, and including means whereby predetermined relative movement of the thermometer stem and the tube by said resilient means when the sample thaws, causes a signalling movement of said member.

References Cited in the file of this patent

UNITED STATES PATENTS 2,297,641     Webber     Sept. 29, 1942
2,651,194     Dickey     Sept. 8, 1953